US010722737B2

(12) United States Patent
Citro et al.

(10) Patent No.: US 10,722,737 B2
(45) Date of Patent: Jul. 28, 2020

(54) AIRBAG MODULE

(71) Applicant: SAES GETTERS S.P.A., Lainate (IT)

(72) Inventors: Marco Citro, Varese (IT); Salvatore Coco, Cesano Maderno (IT); Michele Scarlata, Caronno Pertusella (IT)

(73) Assignee: SAES GETTERS S.P.A., Lainate Mi (IT)

( * ) Notice: Subject to any disclaimer, the term of this patent is extended or adjusted under 35 U.S.C. 154(b) by 0 days.

(21) Appl. No.: 16/495,344

(22) PCT Filed: Sep. 28, 2018

(86) PCT No.: PCT/IB2018/057545
§ 371 (c)(1),
(2) Date: Sep. 18, 2019

(87) PCT Pub. No.: WO2019/064251
PCT Pub. Date: Apr. 4, 2019

(65) Prior Publication Data

US 2020/0016438 A1 Jan. 16, 2020

(30) Foreign Application Priority Data

Sep. 29, 2017 (IT) ........................ 102017000109554

(51) Int. Cl.
*A62B 33/00* (2006.01)
*B60R 21/261* (2011.01)
(Continued)

(52) U.S. Cl.
CPC .......... *A62B 33/00* (2013.01); *A41D 13/0155* (2013.01); *A63B 29/00* (2013.01);
(Continued)

(58) Field of Classification Search
CPC ......... B60R 21/00; B60R 21/16; B60R 21/18; B60R 21/217; B60R 21/26; B60R 21/261;
(Continued)

(56) References Cited

U.S. PATENT DOCUMENTS 5,152,550 A * 10/1992 Hoagland ............. B60R 21/268 280/737
5,242,194 A * 9/1993 Popek ................... B60R 21/272 280/737
(Continued)

FOREIGN PATENT DOCUMENTS

| | | | |
|---|---|---|---|
| EP | 1 464 548 | A1 | 10/2004 |
| JP | 2007-154968 | A | 6/2007 |
| WO | WO 2016/116308 | A1 | 7/2016 |

OTHER PUBLICATIONS

International Preliminary Report on Patentability issued in PCT/IB2018/057545 (PCT/IPEA/409), dated Aug. 2, 2019.
(Continued)

*Primary Examiner* — Lars A Olson
(74) *Attorney, Agent, or Firm* — Birch, Stewart, Kolasch & Birch, LLP

(57) ABSTRACT

An airbag module comprises a control unit, a source of electric current managed by the control unit, a container wherein a gas is stored under pressure, and a hollow body with an inlet duct, in which an outlet of the container sealed by a pierceable membrane is tightly fitted, and an outlet duct on which an inflatable bag is tightly assembled. The airbag module further comprises an actuator assembly configured to pierce open the membrane sealing the container, said actuator assembly comprising a piercing member movably restrained to the body and at least one linear shape memory alloy wire actuator member that is electrically connected to
(Continued)

Figure 1:
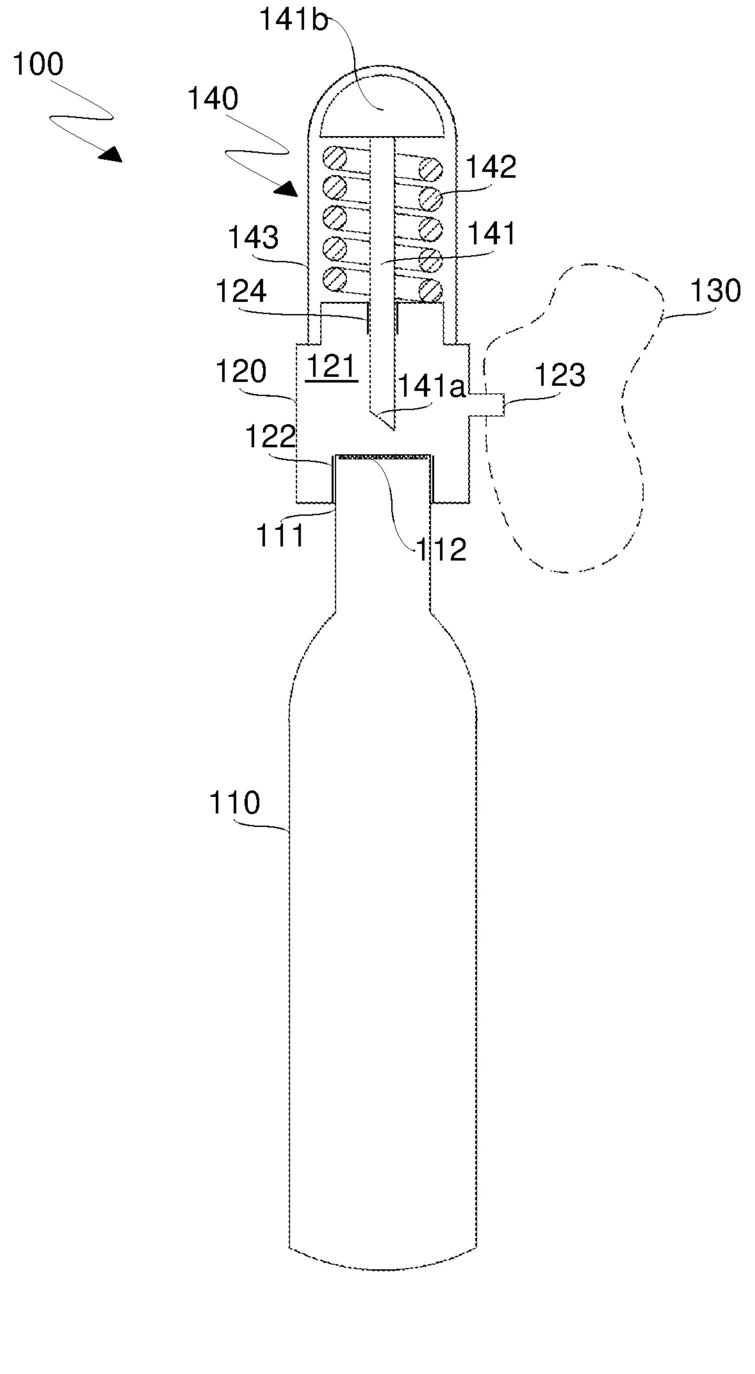

the source of electric current and operably restrained to the piercing member so as to cause it to move beyond the pierceable membrane.

20 Claims, 7 Drawing Sheets

(51) Int. Cl.

| | |
|---|---|
| ***B60R 21/274*** | (2011.01) |
| ***F17C 13/00*** | (2006.01) |
| ***B60R 21/217*** | (2011.01) |
| ***A41D 13/015*** | (2006.01) |
| ***A63B 29/00*** | (2006.01) |

(52) U.S. Cl.
CPC .......... *B60R 21/217* (2013.01); *B60R 21/261* (2013.01); *B60R 21/274* (2013.01); *F17C 13/002* (2013.01); *B60R 2021/2612* (2013.01); *F17C 2270/0181* (2013.01)

(58) Field of Classification Search
CPC ..... B60R 21/268; B60R 21/27; B60R 21/274; F17C 13/002; A63B 29/00; A62B 33/00; A41D 13/015; A41D 13/0155
USPC .............................................. 441/80; 280/737
See application file for complete search history.

(56) References Cited

U.S. PATENT DOCUMENTS

| | | | | |
|---|---|---|---|---|
| 5,893,584 | A * | 4/1999 | Welz | B60R 21/268 280/737 |
| 6,834,885 | B2 * | 12/2004 | Mizuno | B60R 21/268 280/737 |
| 2004/0056459 | A1 | 3/2004 | Kassman et al. | |
| 2018/0009406 | A1 | 1/2018 | Garnier et al. | |

OTHER PUBLICATIONS

International Search Report issued in PCT/IB2018/057545 (PCT/ISA/210), dated Nov. 26, 2018.
Written Opinion of the International Searching Authority issued in PCT/IB2018/057545 (PCT/ISA/237), dated Nov. 26, 2018.

* cited by examiner

AIRBAG MODULE

The present invention generally relates to safety systems and more particularly to an airbag module comprising an actuator assembly including an element made of a shape memory alloy.

Airbag modules known in the art consist of a control unit, a gas generator and a cushion, i.e. an inflatable bag. In a situation of imminent impact, the control unit activates the gas generator, which delivers an appropriate quantity of gas that fills the cushion to a certain pressure in milliseconds. The pressurized cushion expands between the occupant and an object, for example the dashboard or the steering wheel, thereby providing a decelerating and cushioning effect that will protect the occupant upon impact.

Activation of the gas generator is typically carried out by way of one or more pyrotechnic devices, commonly called "initiators" or "electric matches". An electric match, which consists of an electrical conductor wrapped in a combustible material, is activated by a current pulse between 1 and 3 Amperes in less than 2 milliseconds. When the electrical conductor becomes hot enough, it ignites the combustible material, which initiates the gas generator. In an airbag, the electric match is used to ignite a solid propellant inside the airbag inflator, such that the propellant generates an inert gas which inflates the airbag in approximately 20 to 30 milliseconds.

Alternatively to pyrotechnic devices for vehicle airbags, that activate a gas generator, the gas to inflate the airbag can be stored in a container to be opened by mechanically releasing or rupturing a sealing member that closes the outlet of the container. To achieve this, mechanic devices, employing electric wires or pyrotechnic charges as triggering members, for the release of the pressurized gas from the container have been proposed.

For example, U.S. Pat. No. 6,247,725 describes a device for opening a container of pressurized gas intended to inflate an airbag, wherein the container includes a housing and an outlet that is closed by a sealing element which is supported by a pressure member and a stop member against the opening forces exerted by the pressure of the gas stored inside the container. According to an embodiment of the device, the pressure member is restrained by an electric wire which is broken upon heating by supplying an electrical current. Upon breaking of the wire the pressure member is free to move, thereby allowing the sealing member to be ruptured by the pressure of the gas stored in the container and to release the gas.

DE 10158222 A1 describes a similar actuator device associated with a container of pressurized gas for inflating a cushion of an airbag module. An embodiment of the device employs a Nitinol wire that is housed inside the gas container and restrained to a plug sealing an outlet thereof. The device also comprises a controllable source of electrical current, such that the Nitinol wire can be heated and thereby shortened by supplying an electrical current until it is broken. Therefore the plug is released thus allowing the pressurized gas to exit the container.

In other seven embodiments of said device, the same principle of the thermal breaking of a retention wire, by supplying electrical current thereto, is applied to release a pre-loaded spring that drives an element that performs a safety action.

WO 2016/116308 describes another similar device according to the preamble of claim 1, wherein a movable piercing member is pushed towards the sealing member of the pressurized gas container by the combustion gases generated by a pyrotechnic charge so as to pierce said sealing member. Said piercing member is then brought back into the initial position by means of the pressurized gas once the sealing member has been pierced, the pressurized gas being directed towards the cushion.

Upon activation of the airbag module, the damaged components such as e.g. the cushion, the pressurized gas container and its actuator device, are typically replaced by new ones so as to restore operation of the safety system. This requires time and generally has high costs that may be lower when the cushion is not damaged and can be simply folded back into its seat, which is e.g. the case with airbag modules for motorcycles and bicycles, and sometimes also for motor vehicles. However, actuator devices according to any of the above-mentioned embodiments must always be replaced due to their single use configuration.

DE 10158222 A1 mentioned above also describes two embodiments in which the Nitinol alloy is used for its shape memory capability in the form of a coil spring, which is supplied with electrical current in order to change its strength with respect to a biasing spring that performs an opposite action.

More specifically, in a first embodiment the shape memory alloy spring holds a shutter in front of the outlet of a gas container and when its strength is reduced, by supplying a control current thereto, the biasing spring moves the shutter to allow release of the gas. In a second embodiment, on the contrary, the current supplied to the shape memory alloy spring increases its strength such that it can overcome the action of the biasing spring and push a piston, so as to extend an actuating rod that may e.g. pierce the sealing member of the gas container.

The advantage of these embodiments is that they are reversible and reusable, since the Nitinol spring returns to its previous state upon cooling when the supply of the control current is interrupted. However, such a Nitinol spring has to be quite strong since in the first case it must hold steadily the shutter to prevent an undesired actuation of the airbag module, and in the second case it works against a biasing spring that again must be strong enough to prevent an undesired actuation.

Therefore, the shape memory alloy wire required to form such a spring must be rather long and thick, thus requiring a longer time and/or a greater intensity of current for its actuation. These factors make the actuator device more expensive and possibly inadequate for applications that require short actuation times. Moreover, such an arrangement is quite bulky due to the presence of two rather long springs aligned along their axis and to the space required for their extension/retraction.

The purpose of the present invention is therefore to provide an improved airbag module suitable to overcome the drawbacks mentioned above with reference to the prior art. This problem is solved by an airbag module according to the independent claim 1. Preferred features of the present invention are recited in the dependent claims.

The airbag module according to the invention comprises a control unit, a source of electric current managed by the control unit, a container wherein a gas is stored under pressure and a hollow body wherein an outlet of the container sealed by a pierceable membrane is tightly fitted. An inflatable bag is tightly assembled on an outlet duct of the hollow body and the airbag module further comprises an actuator assembly configured to pierce open the membrane sealing the container. The actuator assembly comprises a piercing member movably restrained to the body and at least one linear shape memory alloy wire actuator member that is electrically connected to the source of electric current and operably restrained to the piercing member so as to cause it to move beyond the pierceable membrane.

It is to be underlined that the expression "operably restrained" used in the context of present invention means that the shape memory alloy wire operation (i.e. its actuation) causes the piercing member movement either directly, in case the shape memory alloy wire is in contact with the piercing member, or indirectly in case the shape memory alloy wire acts on a pre-loaded piercing member disengagement system.

The overall configuration of the airbag module is such that, by supplying an electric current to the shape memory alloy wire actuator member, this is heated by Joule effect at a temperature equal to or higher than its Austenite phase temperature, undergoes a shortening and thus causes the movement of the piercing member to cut the pierceable membrane.

Upon cooling down to a temperature below the Martensite phase temperature, the shape memory alloy wire actuator member returns to its original state, thus allowing to move the piercing member to its unactuated position by using a biasing spring or an equivalent biasing system.

The actuator assembly according to present invention may be reset, thus allowing to use it for one or more further actuation cycles. To this aim it is sufficient to fold the inflatable bag of the airbag module and to replace the gas container with a fresh one. The reset procedure is very quick and cheap. This leads to various practical advantages:

- it allows to test the airbag prior to selling or in due course of periodic maintenance;
- in some instances, such as for example in the case of a motorcycle jacket, it may be useful to enhance safety by lowering activation threshold, but this may lead to unintentional activation. With the present invention, the airbag can be reset even by the end user and does not imply particular drawbacks in terms of downtime or maintenance.

Another advantage offered by the invention is that actuation of the airbag module is safe due to the absence of pyrotechnic actuation devices.

Still another advantage of the present actuator assembly is that the use of a linear shape memory alloy wire allows to reduce the bulkiness, cost and actuation time with respect to prior art devices employing shape memory alloy springs. It should be noted that the term "linear" used in the context of present invention means that the shape memory alloy wire is not coiled up into a spring shape, but it could be V-shaped or U-shaped or have another similar shape in which a straight wire can be arranged.

A further advantage, specific of the embodiments with indirect action on the pre-loaded piercing member, is that the disengagement thereof can be achieved with an even smaller force since the shape memory alloy wire does not have to overcome the force of the biasing spring that acts on the piercing member.

Figure 2:
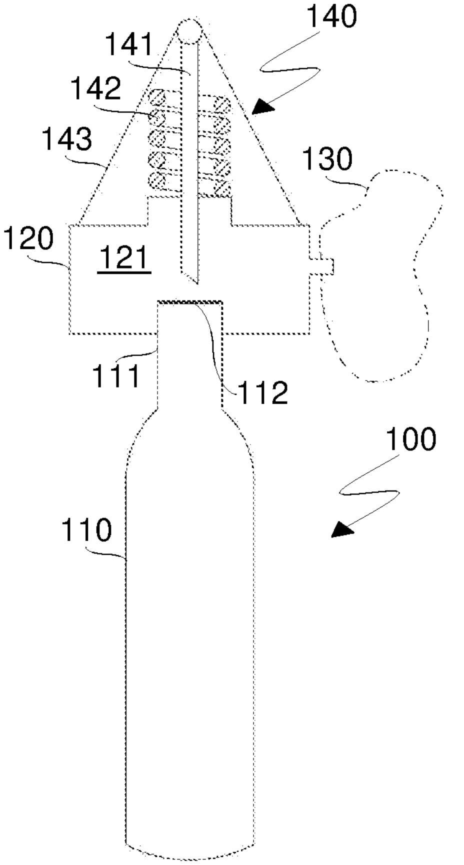
Figure 3:
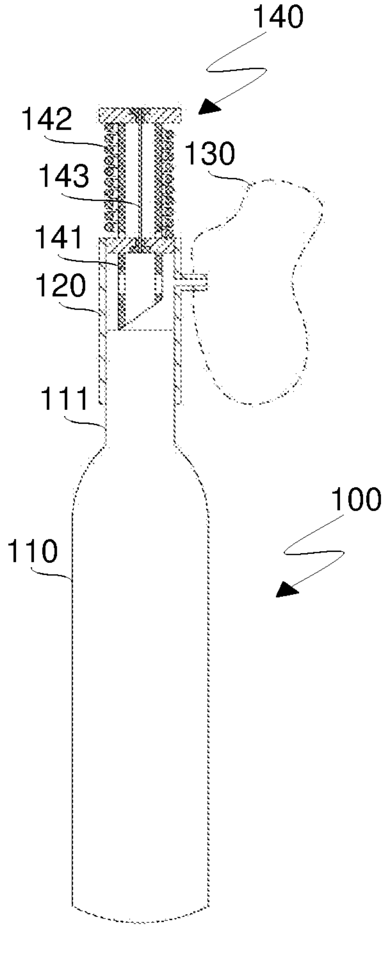
Figure 4:
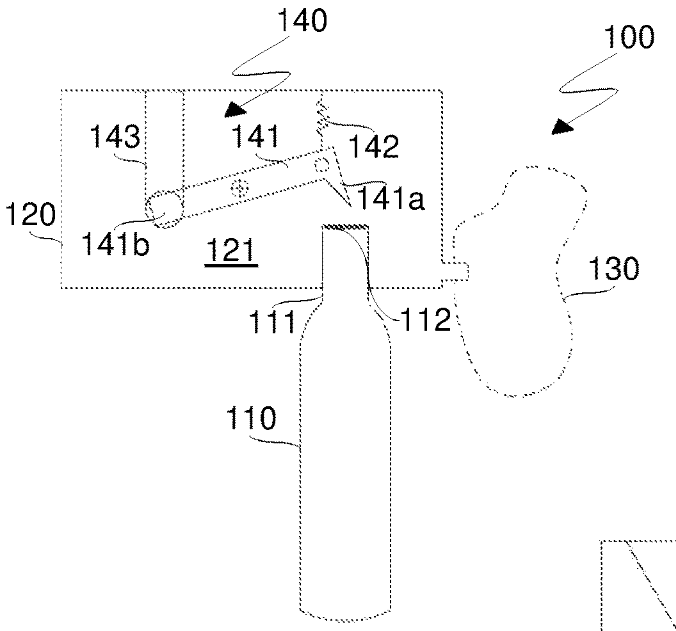
Figure 5:
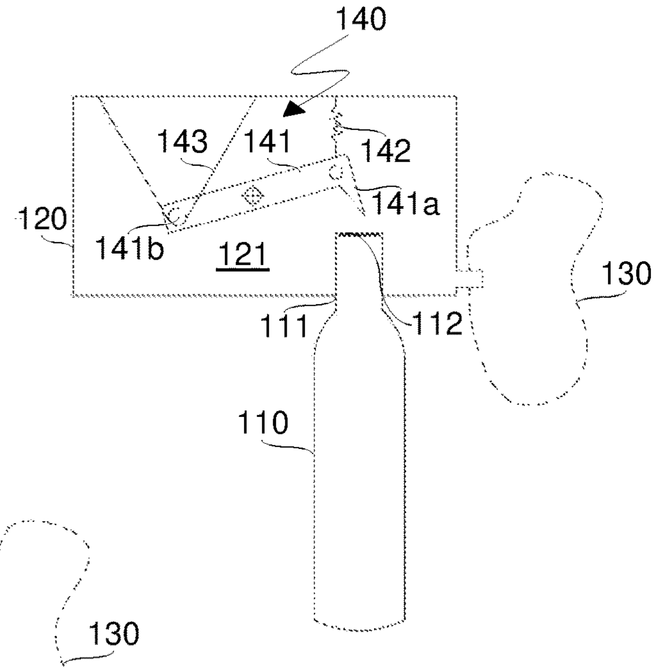
Figure 6:
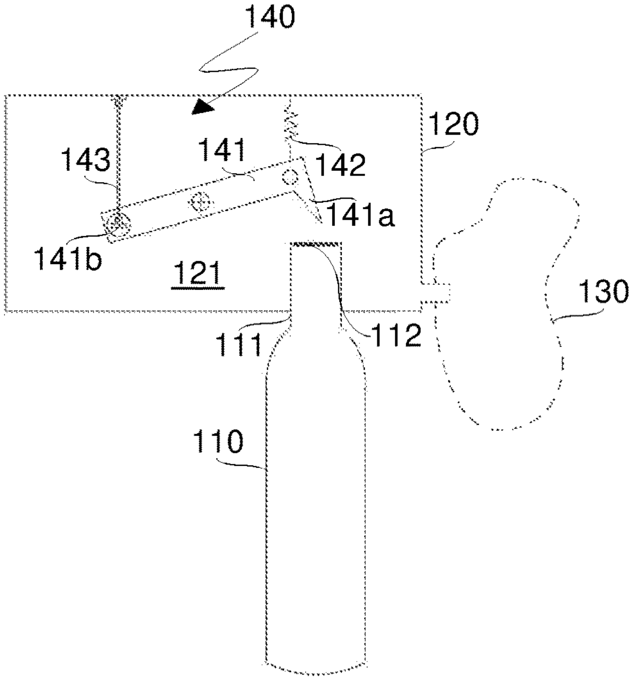

The present invention will be further disclosed in the following by way of a detailed description of some embodiments thereof. In the description reference will be made to the figures of the attached drawings, wherein:

FIG. 1 schematically shows an airbag module according to a first embodiment of the present invention;

FIGS. 2 and 3 respectively schematically show two alternative embodiments of an airbag module according to the present invention;

FIGS. 4 to 6 respectively schematically show three further alternative embodiments of an airbag module according to the present invention;

FIGS. 7-8, 9-10 and 11-12 respectively show three different applications of an airbag module according to the present invention.

Figure 13:
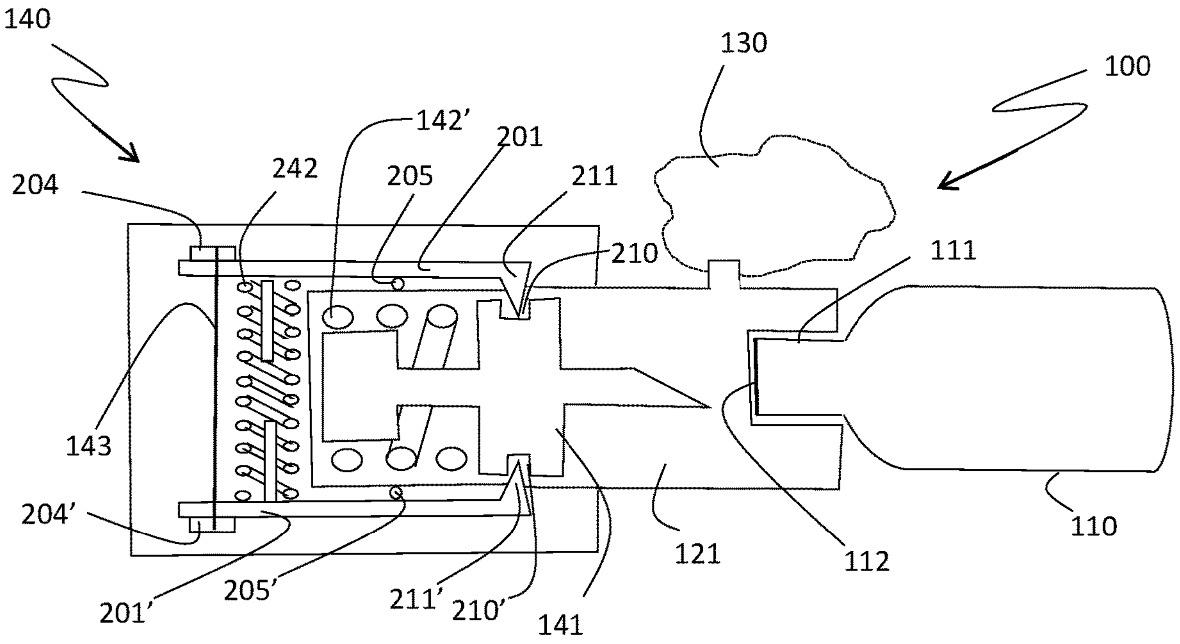
Figure 14:
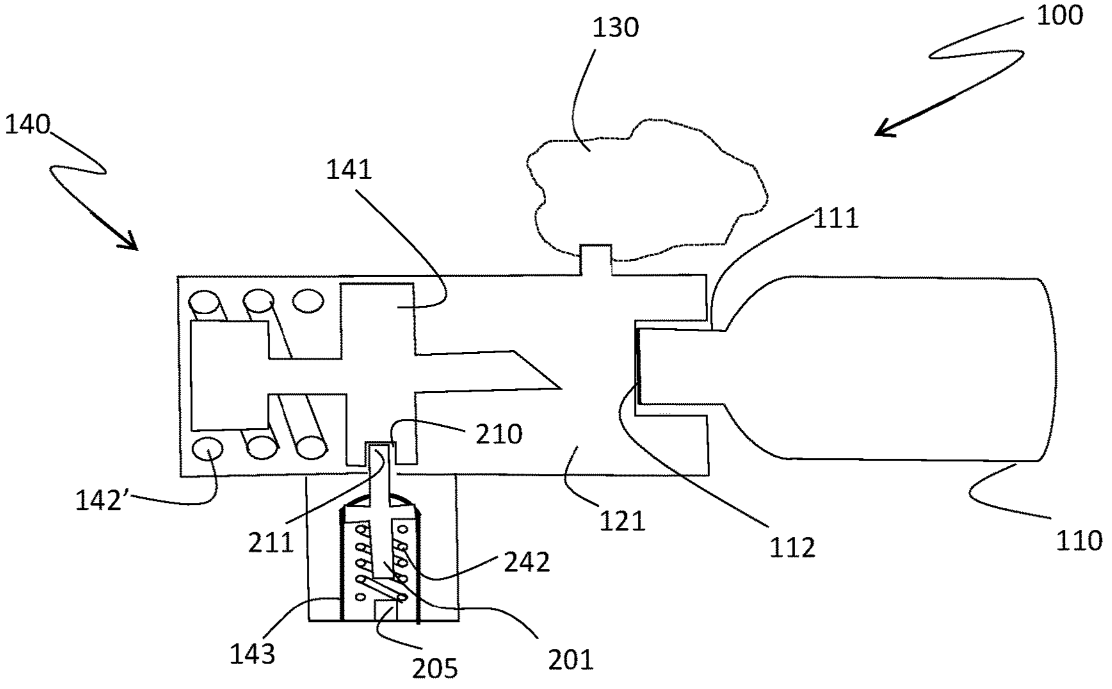

FIGS. 13 and 14 respectively schematically show two further alternative airbag modules according to the present invention.

Referring to FIGS. 1 to 3, an airbag module according to the present invention is schematically indicated by reference numeral 100.

The airbag module 100 comprises a container 110 wherein a gas, such as e.g. $CO_2$, is stored under pressure. The container 110 comprises an outlet 111 sealed by a membrane 112.

The airbag module 100 also comprises a hollow body 120 having a cavity 121, wherein an inlet duct 122 and an outlet duct 123 allowing fluid communication between the cavity 121 and the surrounding environment are formed. The outlet 111 of the container 110 is tightly fitted in the inlet duct 122 of the cavity 121 of the hollow body 120, while an inflatable bag 130, i.e. a cushion, is tightly assembled on the outlet duct 123. By piercing or cutting the membrane 112, the gas stored in the container 110 under pressure fills the cavity 121 of the body, flows out through the outlet duct 123 and thus inflates the bag 130.

The container 110 is removably restrained to the body 120, so that it can be replaced with a new one upon use. To this aim a threaded coupling (not shown) or equivalent means may be used.

The airbag module 100 further comprises an actuator assembly 140 configured to pierce open the membrane 112 sealing the container 110.

The actuator assembly comprises a piercing member 141 movably restrained to the body 120 of the airbag module 100. The piercing member 141 features a cutting end 141*a*, e.g. a sharpened end, suitable to cut the membrane 112 upon actuation. In the embodiments shown in FIGS. 1 to 3, the piercing member 141 is slidably fitted in a seat 124 formed in the hollow body 120 such that the cutting end 141*a* is housed in the cavity 121 and faces the membrane 112.

The actuator assembly 140 may also comprise urging means 142, e.g. a spring, arranged between the hollow body 120 of the airbag module 100 and a distal end 141*b* of the piercing member 141, opposite to the cutting end 141*a* and protruding out of the hollow body 120. The spring 142 urges the piercing member 141 away from the membrane 112.

The actuator assembly 140 further comprises an actuator member 143 in the form of at least one linear shape memory alloy (SMA) wire that is operably connected to the piercing member 141. In the following, reference will be made to a single SMA wire but it will be appreciated that a plurality of SMA wires arranged in parallel might in principle be used to make the actuator member 143.

It is known that shape memory alloys are characterized by a structural transition between two phases, namely the so-called Martensite phase which is stable at a lower temperature, and the so-called Austenite phase, which is stable at a higher temperature. A shape memory alloy is characterized by four temperatures, Mf, Ms, As, Af. Mf is the temperature below which the shape memory alloy is completely in the Martensite phase, i.e. it has a martensitic structure, while Af is the temperature above which the shape memory alloy is fully in the Austenite phase, i.e. it has an austenitic structure. Wires made of a shape memory alloy, also known as SMA wires, can be trained to change their shape when temperature changes from below Mf to above Af, and vice-versa. Processing and training of SMA wires are widely known procedures in the field, as exemplified by the paper "Shape Memory Alloy Shape Training Tutorial" dating back to the Fall 2004 training section "ME559—Smart Materials and Structures".

It is also known that wires made of a shape memory start to shorten at a temperature equal to or higher than the Austenite start temperature As and reach their final length when heated at a temperature equal or above the Austenite final temperature Af.

The configuration of the actuator assembly 140 is such that by heating the SMA wire actuator member 143 the piercing member 141 of the actuator assembly 140 is moved towards the membrane 112 of the container 110 and cuts it thus allowing to dispense the gas stored in the container 110 to inflate the cushion 130.

Operation of the actuator assembly is managed by a control unit (not shown) of the airbag module 100.

The piercing member 141 is preferably hollow and comprises one or more apertures formed in its peripheral wall. This configuration advantageously facilitates the outflow of the gas stored in the container 110 because it provides passages other than that formed upon piercing of the membrane 112.

In the embodiment shown in FIG. 1, the linear SMA wire actuator member 143 is U-shaped and is restrained at both ends on the hollow body 120, while surrounding and contacting the distal end 141*b* of the piercing member 141, which features a suitably rounded shape.

In the embodiment shown in FIG. 2, the SMA wire actuator member 143 is instead V-shaped and is restrained at both ends on the hollow body 120, while surrounding and contacting the distal end 141*b* of the piercing member 141, which also features a suitably rounded shape.

Differently, in the embodiment shown in FIG. 3 the SMA wire actuator member 143 is straight and is restrained at one end to the hollow body 120 and at the opposite end to the distal end 141*b* of the piercing member 141. In this case the actuator member 143 may be advantageously arranged inside the piercing member 141 coaxially thereto, thus providing the advantage of a more compact structure.

As mentioned above, the SMA wire actuator member 143 could comprise more U-shaped, V-shaped or straight wires arranged in parallel, however, the configurations described above employing one single wire are preferred due to ease of assembly and actuation.

FIG. 3 also shows the apertures formed in the peripheral wall of the piercing member 141.

It will be appreciated that, on equal size of the SMA wire actuator member 143, different forces may be exerted on the piercing member 141 depending on the mechanical constraints by way of which it is restrained to the hollow body 120. Hence, the most suitable assembly configuration may be chosen depending on the force required to pierce the membrane 112 of the gas container 110.

For example, by comparing FIGS. 1 and 3, it will be appreciated that a U-shaped configuration can exert a force that is twice the force exerted by a straight wire, whereas the available stroke is substantially the half by using a wire having the same length.

The SMA wire actuator element 143 may be made of a shape memory alloy e.g. having a Martensite phase temperature Mf equal to or lower than 40° C. and an Austenite phase temperature Af equal to or higher than 60° C. Suitable shape memory alloys featuring these temperatures are Ni—Ti based alloys such as Nitinol, with or without additional elements chosen among Hf, Nb, Pt, Cu. The proper choice of the shape memory alloy and its properties are commonly known to those skilled in the art, see for example:

http://memry.com/nitinol-iq/nitinol-fundamentals/transformation-temperatures

Suitable diameters for the SMA wire actuator element are comprised between 75 and 1500 μm, more specifically in case of direct connection of the SMA wire to the piercing member preferred diameters are comprised between 500 and 1500 μm, while in case of indirect connection, i.e. the SMA wire acts on locking elements of a pre-loaded piercing member, preferred diameters are comprised between 75 and 500 μm.

Heating of the SMA wire actuator member 143 is advantageously carried out by supplying an electrical current from a supply source (not shown) controlled by the control unit of the airbag module 100. Since the actuation time must be very short, e.g. comprised between 1 and 100-150 milliseconds, the supply source is preferably made up of one or more capacitors connected in series, in parallel or both, which allow to supply high currents in a very short time.

The thermal energy needed to heat the SMA wire actuator member 143 may be calculated based on the wire mass, the heat capacity of the material of which the wire is made and the required temperature difference. The electric energy of an electric circuit employing a capacitor to supply the SMA wire actuator member 143 may be calculated based on the capacitance of the capacitor and the tension applied to its terminals. The capacitance is calculated based on the discharge time needed to activate the SMA wire actuator member 143 and on its electrical resistance.

The control unit may also advantageously comprise an automatic energy saving system (not shown) configured to interrupt supply of the electric current to the capacitor(s) so as to avoid waste of energy when these are fully charged.

The control unit of the airbag module 100 may advantageously comprise automatic switching means, such as e.g. a transistor, configured to interrupt current supply after a given time so as to preserve operation of the SMA wire actuator member 143. In other words the automatic switching means allow to provide an electrical current for a specific time.

Differently from prior art airbag modules whose actuator assemblies are configured for a single actuation, the actuator assembly of the airbag module of the invention may be reset and used for one or more further cycles as it will be explained in greater detail in the following. When the SMA wire actuator member 143 cools down below the Martensite phase temperature Mf, its length is increased and it returns to the original size and shape, so that the piercing member 141 may be brought back to its original position due to the force exerted by the spring 142. The actuator assembly is thus reset and can operate in the same manner for one or more further cycles, i.e. it may be used for further actuation cycles of the airbag module.

Alternatively to the use of the spring 142, which allows to automatically move the piercing member 141 back to its unactuated position, the actuator assembly 140 may be manually reset, e.g. by employing manual adjusting means (not shown) associated with the distal end 141*b* of the piercing member 141.

It will be appreciated that further configurations of the piercing member 141 may exist other than the sliding configuration described above.

For example, FIGS. 4 to 6 schematically show a lever-shaped piercing member 141 pivoted at an intermediate portion thereof on the hollow body 120. The SMA wire actuating member 143 is restrained at a distal end 141*b* of the piercing member 141, while the return spring 142 is restrained at the opposite end, which is also provided with a cutting, e.g. hook-shaped, profile 141*a*. Also in this case, the SMA wire actuating member 143 may feature a U shape or V shape surrounding the distal end 141*a* of the piercing member 141 and restrained at both ends to the hollow body 120, as shown in FIGS. 4 and 5 respectively. Alternatively, at least one straight SMA wire may be employed as shown in FIG. 6, connecting the distal end 141*b* to the hollow body 120. It will be appreciated that the configuration of the SMA wire actuator member 143 depends on the force needed to cut the membrane 112 of the gas container 110.

Turning now to FIGS. 7 to 12, three examples of application of the airbag module according to the invention will be briefly described.

Figure 7:
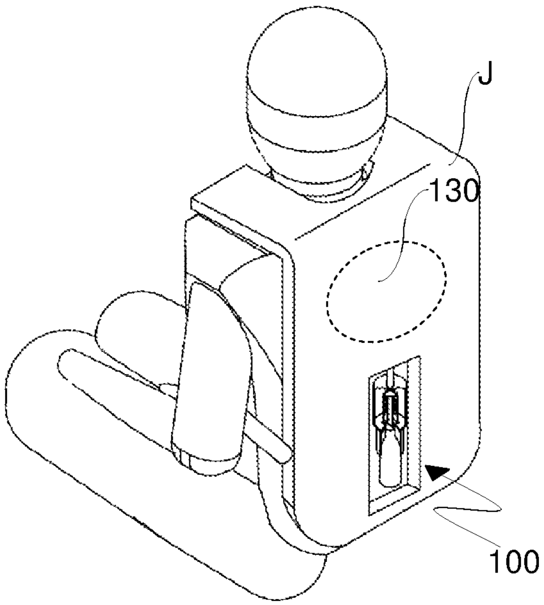
Figure 8:
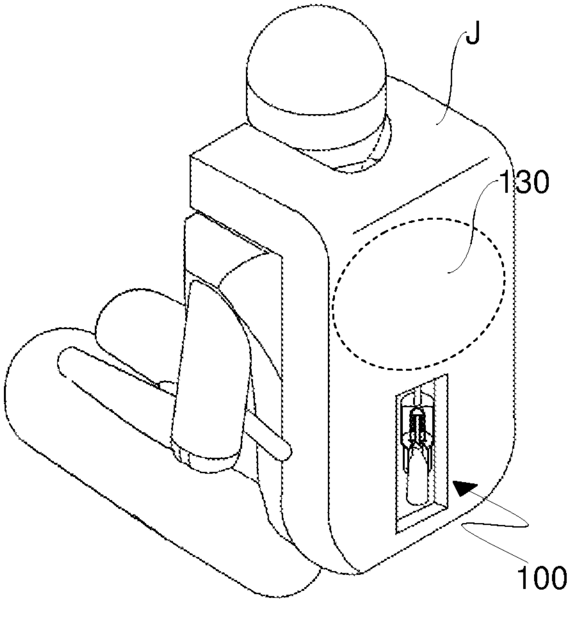

FIG. 7 shows an airbag motorcycle jacket J wherein an airbag module 100 according to the invention is fitted. As it may be seen, the airbag module 100 is housed for example in a pocket formed in the portion of the jacket intended to be arranged on the back of a user. FIG. 8 shows the airbag motorcycle jacket in an inflated condition, wherein the inflatable bag 130, housed and hidden in the jacket J, is expanded so as to protect e.g. the back, the head and the chest of the user.

Figure 9:
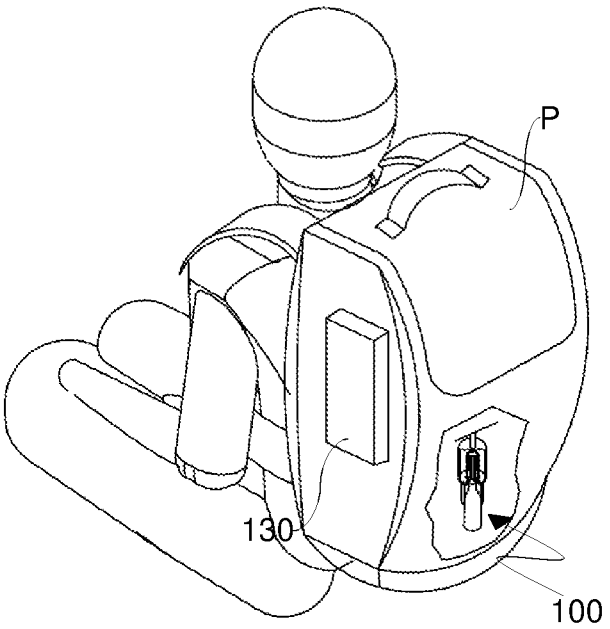
Figure 10:
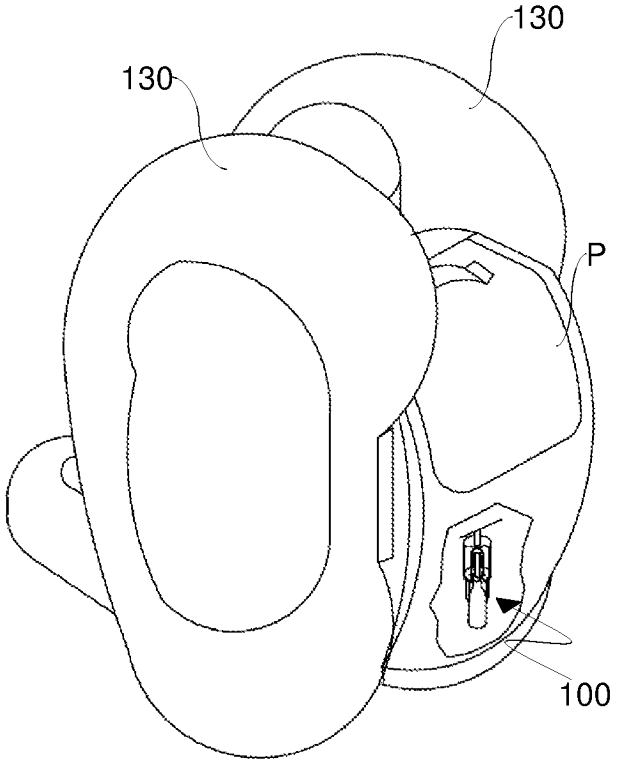

FIG. 9 shows an avalanche airbag backpack P. Also in this case, the airbag module 100 is housed for instance in a pocket formed in the portion of the backpack intended to be arranged on the outside. The illustrated avalanche airbag backpack e.g. comprises two inflatable bags 130 arranged at opposite sides. FIG. 10 shows the avalanche airbag backpack P in an inflated condition, wherein the inflatable bags 130 are expanded so as to protect e.g. the sides and the head of the user and to allow a user to remain on the surface of the snow in case of an avalanche.

Figure 11:
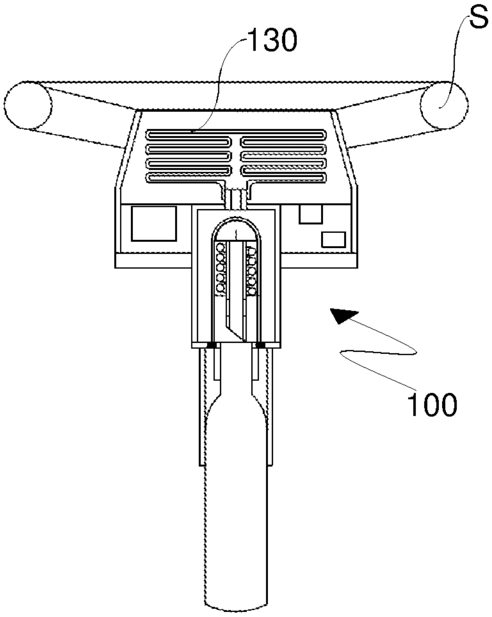
Figure 12:
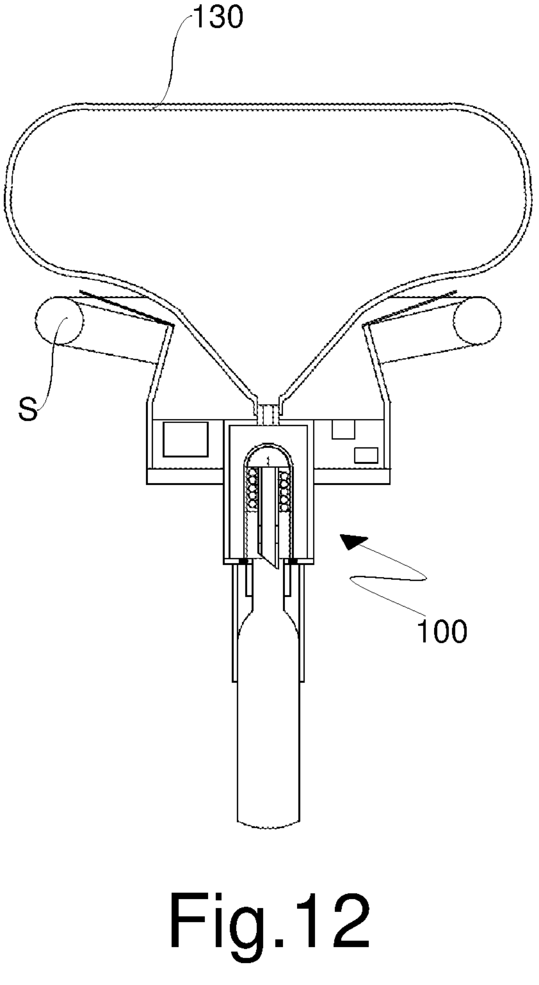

FIGS. 11 and 12 show a vehicle safety system S, e.g. in the form of a steering wheel assembly, comprising an airbag module 100 according to the invention. As it may be seen, the inflatable bag 130 is arranged for example in a breakable housing formed in the central portion of the steering wheel S, while the actuator assembly 140 is arranged in a housing e.g. formed in the dashboard of the vehicle.

It will be appreciated that the airbag module 100 according to the invention may also be employed to deploy inflatable bags stored inside the dashboard, as well as inflatable bags arranged inside the seats of a vehicle and configured to protect driver and passengers from side impacts, and more generally all the inflatable bags forming a vehicle safety system. Other suitable applications for an airbag according to the present invention are for example safety garments for workers at height, patients suffering for balance illness (epilepsy, Alzheimer disease), electronic equipment such as drones that may fall from operating/cruising height.

FIG. 13 shows an airbag module 100 according to another embodiment of the present invention. In particular, the shape memory alloy wire 143 is not directly connected to the piercing member 141, but rather controls its movement by acting on locking elements 201, 201' each with a protrusion 211, 211' entering into corresponding cavities, 210, 210' of the piercing member 141.

The actuation of the shape memory alloy wire 143 counters the force of the biasing spring 242 and acting through the wire anchoring elements 204, 204' causes the locking elements 201, 201' to rotate around pivots 205, 205'. As a consequence, protrusions 211, 211' are disengaged from cavities 210, 210', thus allowing the piercing member 141 to impinge on the pierceable membrane 112, breaking it, under the push of spring 142'.

An alternate embodiment of the airbag of FIG. 13 is shown in FIG. 14. Also in this case, the shape memory alloy wire 143 is not directly in contact with the piercing member 141, but instead acts on a locking element 201 whose extremity 211 enters into a cavity 210 of the piercing member 141 under the action of a biasing spring 242, fitted between an end stopper 205 and the locking element 201. Disengagement is provided by actuation of the substantially U-shaped shape memory alloy wire 143 that overcomes the force of the biasing spring 242, thus pulling back locking element 201 towards the end stopper 205 and disengaging extremity 211 from cavity 210. As a consequence, the piercing member 141 impinges on the pierceable membrane 112, breaking it, under the push of spring 142'.

It should be noted that in these two embodiments, contrary to the embodiments of FIGS. 1-6, the spring 142' arranged between the hollow body 120 of the airbag module 100 and the piercing member 141 urges the latter towards membrane 112. Therefore, the actuator assembly 140 must be manually reset, as previously mentioned, by pushing back the piercing member 141 into engagement with the locking elements 201, 201'.

The invention claimed is:

1. An airbag module (100) comprising:

i) a control unit;

ii) a source of electrical current managed by said control unit;

iii) a container (110) wherein a gas is stored under pressure, said container (110) comprising an outlet (111) sealed by a pierceable membrane (112); and iv) a hollow body (120) having a cavity (121), an inlet duct (122) and an outlet duct (123), wherein:

said outlet (111) of the container (110) is fitted in said inlet duct (122) of said hollow body (120) and wherein an inflatable bag (130) is tightly assembled on said outlet duct (123) of the hollow body (120);

the airbag module (100) further comprising an actuator assembly (140) configured to pierce open said membrane (112) sealing the container (110), said actuator assembly (140) comprising a piercing member (141) movably restrained to the body (120) so as to move a piercing end (141*a*) thereof beyond the pierceable membrane (112), characterized in that the actuator assembly (140) further comprises at least one linear shape memory alloy wire actuator member (143) that is electrically connected to the source of electrical current and operably restrained to said piercing member (141), and the overall configuration of the airbag module being such that by supplying an electrical current to said at least one linear shape memory alloy wire actuator member (143) this is heated at a temperature equal to or higher than its Austenite phase temperature (Af), undergoes a shortening and thus causes the piercing member (141) to cut the pierceable membrane (112) by moving therethrough, the linear shape memory alloy wire actuator member (143) returning to its previous size and shape upon cooling below its Martensite phase temperature (Mf).

2. An airbag module (100) according to claim 1, wherein the at least one linear shape memory alloy wire actuator member (143) is directly in contact with the piercing member (141).

3. An airbag module (100) according to claim 1, wherein the actuator assembly (140) also comprises urging means (142) arranged between the hollow body (120) and a distal end (141*b*) of the piercing member (141), opposite to a cutting end (141*a*) thereof, so as to bias the piercing member (141) away from the pierceable membrane (112).

4. An airbag module (100) according to claim 1, wherein the piercing member (141) of the actuator assembly is a lever pivoted at an intermediate portion thereof on the hollow body (120), and wherein the at least one linear shape memory alloy wire actuator member (143) is in contact with a distal end (141*b*) of said lever, while a cutting profile (141*a*) is formed at an opposite end of the lever.

5. An airbag module (100) according to claim 1, wherein the at least one linear shape memory alloy wire actuator member (143) is U-shaped or V-shaped and is restrained at both ends on the hollow body (120), while surrounding and contacting the distal end (141*b*) of the piercing member (141).

6. An airbag module (100) according to claim 1, wherein the at least one linear shape memory alloy wire actuator member (143) is straight and is restrained at one end to the hollow body (120) and at the opposite end to the distal end (141*b*) of the piercing member (141).

7. An airbag module (100) according to claim 1, wherein the at least one linear shape memory alloy wire actuator member (143) is in contact with one or more locking elements (201, 201') engaging the piercing member (141) so as to resist the push of a pre-loaded spring (142') arranged to bias the piercing member (141) towards the pierceable membrane (112).

8. An airbag module (100) according to claim 7, wherein the at least one linear shape memory alloy wire actuator member (143) is arranged to overcome the push of one or more springs (242) arranged to bias the one or more locking elements (201, 201') into engagement with the piercing member (141).

9. An airbag module (100) according to claim 1, wherein the piercing member (141) is hollow and comprises one or more apertures formed in its peripheral wall.

10. An airbag module (100) according to claim 1, wherein the linear shape memory alloy wire actuator element (143) is made of a Ni—Ti alloy.

11. An airbag module (100) according to claim 1, wherein the linear shape memory alloy wire actuator element (143) is made of a Ni—Ti alloy comprising one or more additional elements chosen among Hf, Nb, Pt, Cu.

12. An airbag module (100) according to claim 1, wherein the source of electric current controlled by the control unit is made up of one or more capacitors connected in series or parallel or both.

13. An airbag module (100) according to claim 1, wherein the control unit comprises automatic switching means configured to provide the electric current for a specific time.

14. An airbag module (100) according to claim 1, wherein the control unit comprises an automatic energy saving system.

15. An airbag module (100) according to claim 1, wherein in case of direct contact of the actuator element (143) with the piercing member (141) the diameter of the at least one linear shape memory alloy wire is between 500 and 1500 μm, while in case of indirect connection in which the actuator element (143) acts on the locking elements (201, 201') said diameter is between 75 and 500 μm.

16. An airbag motorcycle jacket (J), said airbag motorcycle jacket (J) comprising the airbag module (100) according to claim 1.

17. An avalanche airbag pack (P), said avalanche airbag pack (P) comprising the airbag module (100) according to claim 1.

18. A vehicle safety system (S), said vehicle safety system (S) comprising the airbag module 100 according to claim 1.

19. A safety garment, said safety garment comprising the airbag module (100) according to claim 1.

20. A moving electronic device safety system, said moving electronic device safety system comprising the airbag module (100) according to claim 1.

* * * * *